Nov. 30, 1926.  
G. T. JOHNSON  
CAR TRUCK  
Filed March 7, 1925    2 Sheets-Sheet 1  
1,608,510
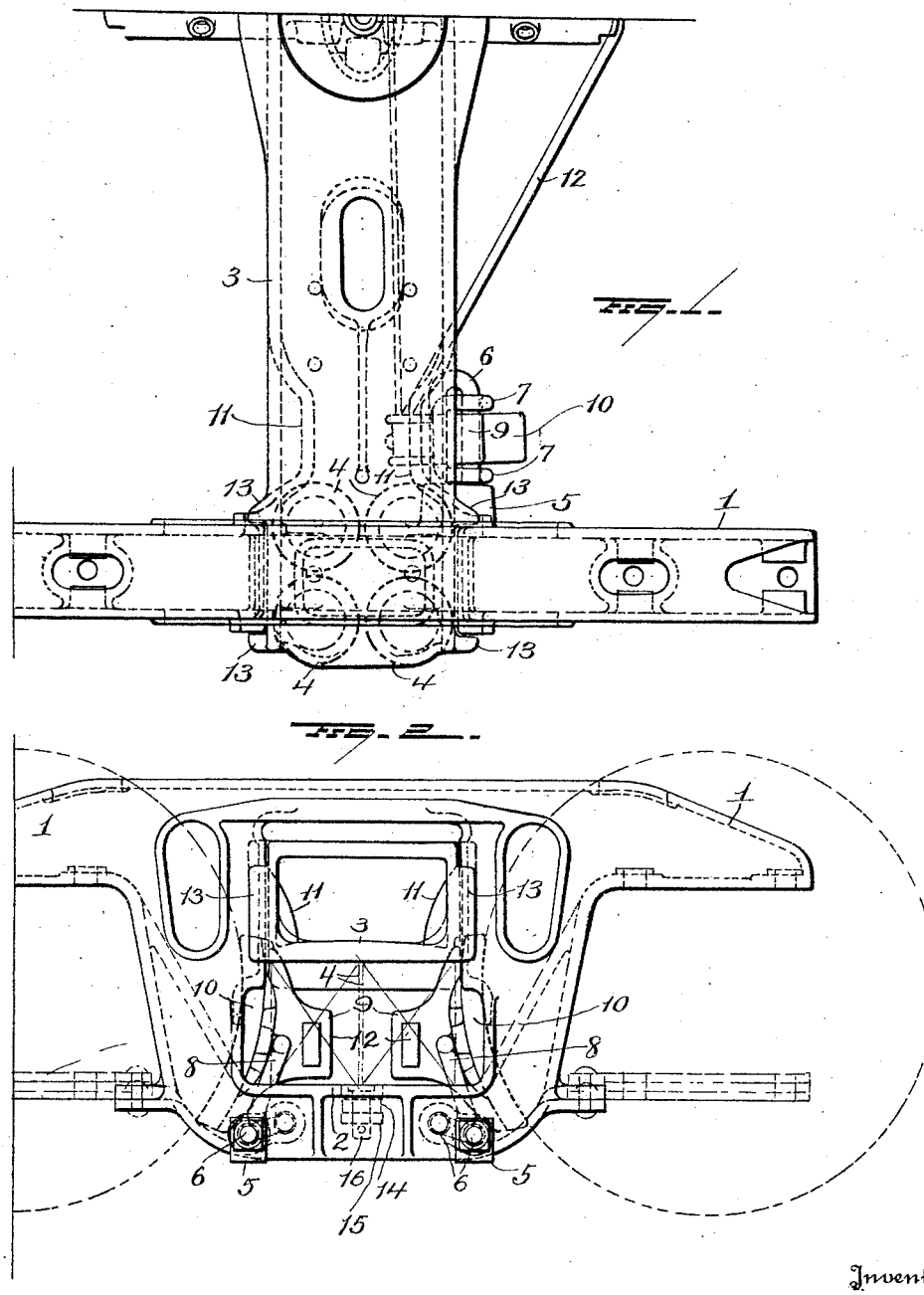

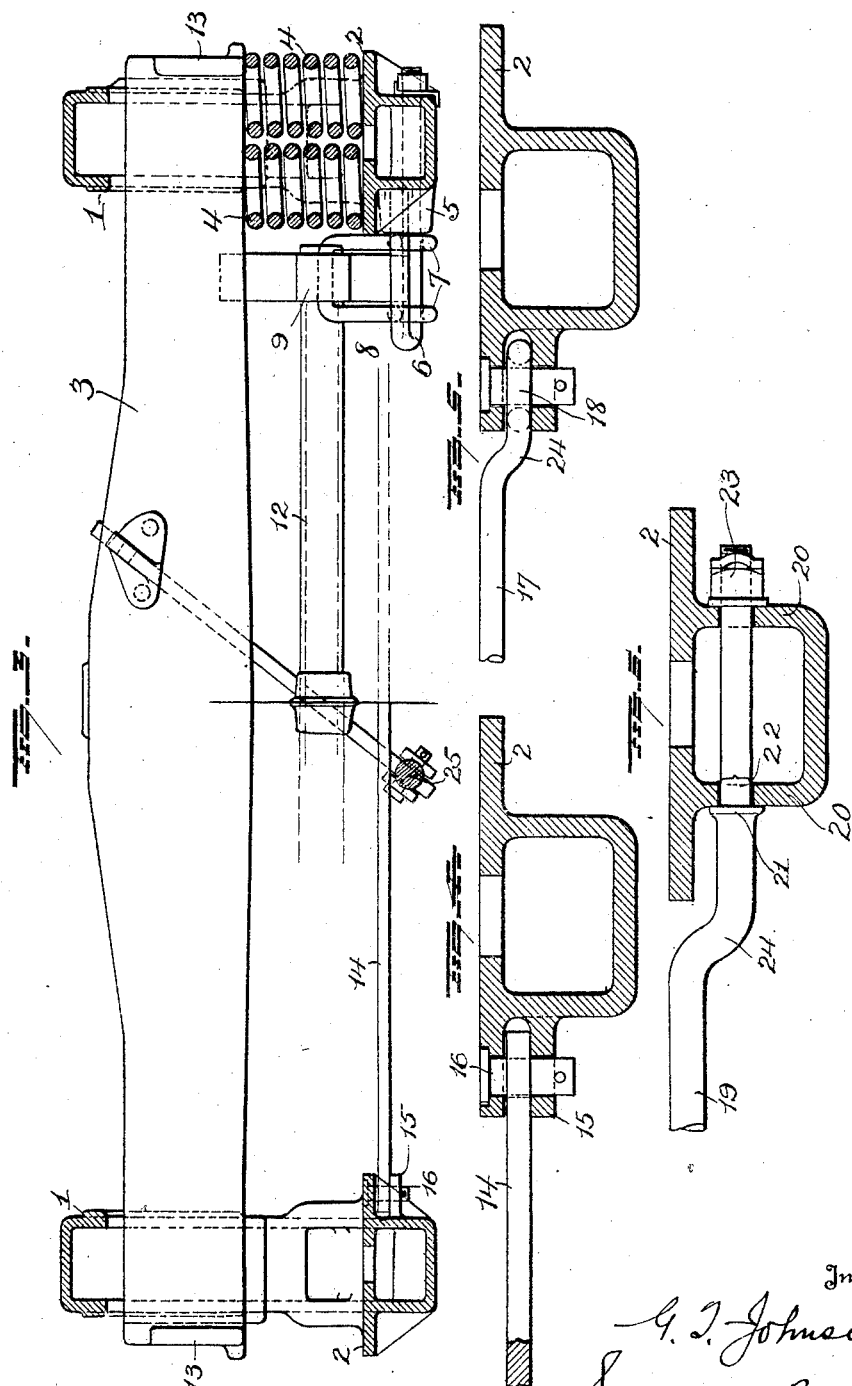

Patented Nov. 30, 1926.

1,608,510

UNITED STATES PATENT OFFICE.

GEORGE T. JOHNSON, OF COLUMBUS, OHIO, ASSIGNOR TO THE BUCKEYE STEEL CASTINGS COMPANY, OF COLUMBUS, OHIO.

CAR TRUCK.

Application filed March 7, 1925. Serial No. 13,798.

This invention relates to car trucks and has special reference to trucks for ore cars.

In some localities, owing to peculiar construction of piers, cars for conveying ore from the pits to the shipping ports are necessarily very short and the load that may be carried is, consequently, limited. The gummy nature of the ore makes dumping difficult and large openings or doors are usually provided in the bottoms of the cars to expedite the dumping. Obviously, the larger the openings are the quicker the ore is discharged but the side of the opening is limited by the distance between the car trucks or the inner wheels of the trucks. One object of the present invention, therefore, is to provide an efficient truck of short wheel base thereby increasing the space between the inner wheels of the trucks, and another object of the invention is to accommodate the mounting of the brake beams to the shortened wheel base of the truck without interference between the brake beams and the truck bolster. Other objects will appear in the course of the following description.

The invention is illustrated in the accompanying drawings in which Figure 1 is a plan view of a portion of a car truck embodying the invention;

Figure 2 is a side elevation thereof;

Figure 3 is a view partly in side elevation and partly in section;

Figures 4, 5 and 6 are enlarged detail sections showing different forms of spacing connections between the side frames.

In the drawings, the reference numeral 1 designates a side frame having a spring seat 2 above which the end of the bolster 3 is supported by springs 4 resting directly on the spring seat. It will be seen at once that this arrangement dispenses with the spring plank which is generally considered necessary in standard trucks and which is usually a channel bar disposed below the bolster and attached to and extending between the side frames. Provided in the side frames, in any approved manner, below the spring seat are bearings 5 receiving one end of a bracket or fulcrum member 6 which is illustrated as a substantially U-shaped rod projecting laterally inward from the side frame close to the bottom thereof.

Upon one branch of the U-shaped bracket 6 are loosely fitted eyes 7 at the lower ends of a stirrup 8, the upper end or shoulder of which is pivotally engaged through a brake-shoe head 9 carrying a brake shoe 10 in the usual manner. By referring to Figures 1 and 2, it will be noted that the brake beams to which the brake shoe heads are attached are disposed beneath the bolster, and the lower edge portions of the bolster may be inset, as indicated at 11, so that, even in the extreme low position of the bolster, there will not be contact between the bolster and the brake shoe head and the brake shoes can be removed when worn to the usual limits. It will, of course, be understood that the brake shoe heads and their mountings are duplicated at the two side frames of the truck and at opposite sides of the central line of the bolster. The brakes on the same side of the center of the bolster are connected by a brake beam 12 which, of course, is duplicated at the opposite side of the bolster. While, as shown in Figure 1, a portion of each brake beam extends beyond the side of the bolster for strength and to be connected with the operating mechanism, the greater portion of each brake beam lies under the bolster, thus bringing the parts into such compact relation that the wheel base of the truck may be very materially shortened. By arranging the brake-carrying stirrups below, instead of above, the brake beams. I avoid interference between the bolster and the brake beams even when the springs 4 are fully compressed under load, while the brake beams are brought close together.

The ends of the bolster project through openings formed therefor in the side frames and are provided with ribs or guides 13 which guide the vertical movements of the bolster. The bolster, therefore, constitutes a spacing connection between the side frames, but to guard to the utmost against lateral movement of the side frames, a connecting rod 14 may be provided. This connecting rod is disposed midway between the brakes and their fittings and in Figures 3 and 4 is shown as a flat bar having its end provided with a hole and inserted beneath the edge of the spring seat 2 and over a lug 15 below said edge, a key 16 being inserted through the assembly to hold the parts together. In Figure 5, the key 16 is employed to secure the parts but the connecting rod 17 is round instead of flat and has an eye 18 formed at its end to receive the key. In Figure 6 is shown a round connecting rod 19 having its ends inserted through the walls 20 of the side frame below the spring seat, the end portion of the rod having a shoulder or abutment 21 to impinge against one wall and having flat faces 22 immediately adjacent the abutment to fit in an angular opening in the wall and thereby prevent rotation of the rod. On the extremity of the rod is a nut 23 which may be turned home against the adjacent wall of the side frame whereby to clamp the abutment 21 thereagainst and firmly secure the rod in place. In Figures 5 and 6, the rods are formed with offsets 24 to clear the connection 25 which couples the brake levers although, as shown in Figure 3, the offset may not always be necessary. The round bar is preferred as it is somewhat more flexible and will more readily conform to the movement in rounding curves.

Having fully described my invention what I claim as new and desire to secure by Letters-Patent, is:—

1. A car truck including side frames, a bolster carried by and extending between the side frames, brackets on the inner sides of said frames at the bottom thereof and under the bolster, stirrups mounted on and rising from said brackets, and brakes carried by the upper ends of the stirrups.

2. A car truck comprising side frames, stirrups supported at their lower ends on the side frames, brake shoe heads pivotally mounted on the upper ends of the stirrups, brake beams connecting corresponding brake shoe heads, and a bolster supported by the side frames over the brake beams.

3. A car truck comprising side frames, brakes mounted on the side frames at the bottom thereof, brake beams connecting corresponding brakes, a bolster supported by the side frames over the brake beams, and a connecting rod secured to and extending between the side frames midway between the brake beams.

In testimony whereof, I have signed this specification.

GEORGE T. JOHNSON.